(12) United States Patent
Cai et al.

(10) Patent No.: US 8,437,268 B2
(45) Date of Patent: May 7, 2013

(54) SYSTEM AND METHOD FOR INTRA-CELL FREQUENCY REUSE IN A RELAY NETWORK

(75) Inventors: Zhijun Cai, Irving, TX (US); Yi Song, Irving, TX (US); Yi Yu, Irving, TX (US); Rose Qingyang Hu, Irving, TX (US)

(73) Assignee: Research In Motion Limited, Waterloo (CA)

( * ) Notice: Subject to any disclaimer, the term of this patent is extended or adjusted under 35 U.S.C. 154(b) by 325 days.

(21) Appl. No.: 12/704,739

(22) Filed: Feb. 12, 2010

(65) Prior Publication Data

US 2011/0199985 A1  Aug. 18, 2011

(51) Int. Cl.
*H04L 12/56* (2006.01)
*H04J 1/16* (2006.01)

(52) U.S. Cl.
USPC .......................... 370/252; 370/278; 370/329

(58) Field of Classification Search .................. 370/252, 370/278, 329
See application file for complete search history.

(56) References Cited

U.S. PATENT DOCUMENTS

| | | | |
|---|---|---|---|
| 2005/0250511 A1* | 11/2005 | Xiao et al. ...................... | 455/453 |
| 2008/0009243 A1 | 1/2008 | Hart | |
| 2008/0085703 A1 | 4/2008 | Michaelsen et al. | |
| 2008/0287155 A1 | 11/2008 | Xu et al. | |
| 2009/0170509 A1 | 7/2009 | Cai et al. | |
| 2009/0239525 A1 | 9/2009 | Cai et al. | |
| 2010/0008244 A1* | 1/2010 | Sampath et al. .............. | 370/252 |
| 2010/0022184 A1 | 1/2010 | Khoshnevis et al. | |
| 2010/0029320 A1* | 2/2010 | Malladi et al. ................. | 455/522 |
| 2010/0056197 A1* | 3/2010 | Attar et al. .................... | 455/522 |
| 2010/0304665 A1 | 12/2010 | Higuchi | |
| 2010/0322143 A1 | 12/2010 | Cai et al. | |
| 2010/0325506 A1 | 12/2010 | Cai et al. | |

FOREIGN PATENT DOCUMENTS

| | | |
|---|---|---|
| JP | 2009-177628 A | 8/2009 |
| WO | 2011053865 A | 5/2011 |

OTHER PUBLICATIONS

3GPP TR 36.814 v0.4.1; 3rd Generation Partnership Project; Technical Specification Group Radio Access Network, "Further Advancements for E-UTRA, Physical Layer Aspects"; Release 9; Feb. 2009.
3GPP TR 36.212 v8.6.0; 3rd Generation Partnership Project; Technical Specification Group Radio Access Network, Evolved Universal Terrestrial Radio Access (E-UTRA); Multiplexing and Channel Coding; Release 8; 2009.

(Continued)

*Primary Examiner* — John Pezzlo
(74) *Attorney, Agent, or Firm* — Novak Druce Connolly Bove + Quigg LLP

(57) ABSTRACT

A method for communicating using a wireless communication network is presented. The method may include receiving a channel quality indicator (CQI) from a first UE. The first UE is served by a base station. The CQI characterizes a channel quality between the first UE and the base station when the base station transmits at a high power. A first modulation and coding scheme (MCS) may be determined for when the base station transmits at a low power based on the received CQI. When the spectrum efficiency of the first MCS is equal to or higher than the spectrum efficiency of a pre-determined MCS, first UE may be communicated with using a low power transmission. In some cases, a physical downlink control channel (PDCCH) downlink control information (DCI) message is transmitted to the first UE to identify a power spectral density (PSD) level.

10 Claims, 10 Drawing Sheets

OTHER PUBLICATIONS

R1-093726, "Text proposal for channel model and evaluation methodology", CMCC, #58.

R1-094461, "DL performance evaluation of Type-II relay", RIM, #59.

Motorola; TSG-RAN WG1 #54, "Classification of Relays," R1-083223; Jeju, South Korea; Aug. 18-22, 2008.

Qualcomm Europe; 3GPP TSG-RAN WG1 #54; "Operation of Relays in LTE-A," R1-083191; Jeju, S. Korea, Aug. 18-22, 2008.

PCT application No. PCT/US2011/024528, International Search Report and Written Opinion of the International Searching Authority, mailed Jun. 15, 2011.

Qualcomm Europe: 3GPP TSG-RAN WG1 #57, Title: "Challenges with Type II Relay Operation," R1-092058; San Francisco, USA; May 4-8, 2009.

Vodafone, CMCC, CHTTL, Alcatel-Lucent, Alcatel-Lucent Shanghai, Bells, CATT, HTC, ITRI, ZTE; 3GPP TSG RAN WG1 #56bis, Title: "Use cases of Type II Relay," R1-091624, Seoul, South Korea; Mar. 23-27, 2009; 5 pgs.

TSG-RAN WG1 #57bis, "Measurement of Access Downlink of Type II Relay", R1-092471, Los Angeles, USA; Jun. 29-Jul. 3, 2009.

3GPP TSG-RAN WG1 #57, "System Design Frameworks to Support Type II Relay Operation in LTE-A", R1-092157, San Francisco, CA, USA; May 4-8, 2009.

Samsung, 3GPP TSG RAN WG1 Meeting #53bis, "Application of Network Coding in LTE-Advanced Relay," R1-082327; Warsaw, Poland; Jun. 30-Jul. 4, 2008.

China Mobile, Vodafone, Huawei; TSG-RAN WG1 #54; Title: "Application Scenarios for LTE-Advanced Relay", R1-082975, Jeju, Korea, Aug. 18-22, 2008.

Ericsson, TSG-RAN WG1 #53, "A Discussion on Some Technology Components for LTE-Advanced", R1-082024, Kansas City, MO, USA; May 5-9, 2008.

3GPP TR 36.304 v8.5.0; 3rd Generation Partnership Project; Technical Specification Group Radio Access Network, Evolved Universal Terrestrial Radio Access (E-UTRA); User Equipment (UE) Procedures in Idle Mode; Release 8; 2009.

3GPP TR 36.321 v8.5.0; 3rd Generation Partnership Project; Technical Specification Group Radio Access Network, Evolved Universal Terrestrial Radio Access (E-UTRA); Medium Access Control (MAC) Protocol Specification; Release 8; 2009.

3GPP TR 36.331 v8.5.0; 3rd Generation Partnership Project; Technical Specification Group Radio Access Network, Evolved Universal Terrestrial Radio Access (E-UTRA); Radio Resource Control (RRC) Protocol Specification; Release 8; 2009.

Qualcomm Europe, 3GPP TSG-RN WG1 #58, "Challenges with Type II relay operation", R1-093113, Shenzhen, China, Aug. 24-28, 2009.

English Patent Abstracts of JP2009-177628, published on Aug. 6, 2009.

NPL_2_3GPP TR 36.212 v8.6.0; 3rd Generation Partnership Project; Technical Specification Group Radio Access Network, Evolved Universal Terrestrial Radio Access (E-UTRA); Multiplexing and Channel Coding; Release 8; Feb. 2009.

NPL_3_3GPP TSG RAN WG1 #58 R1-093726, "Text Proposal for Channel Model and Evaluation Methodology", China Mobile, Shenzhen, Aug. 24-28, 2009.

NPL_4_3GPP TSG RAN WG1 #59 R1-094461, "DL Performance Evaluation of Type-II Relay", Research in Motion, UK Limited, Jeju, Korea, Nov. 9-13, 2009.

NPL_15_3GPP TR 36.304 v8.5.0; 3rd Generation Partnership Project; Technical Specification Group Radio Access Network, Evolved Universal Terrestrial Radio Access (E-UTRA); User Equipment (UE) Procedures in Idle Mode; Release 8; 2009.

NPL_16_3GPP TR 136.321 v8.5.0; 3rd Generation Partnership Project; Technical Specification Group Radio Access Network, Evolved Universal Terrestrial Radio Access (E-UTRA); Medium Access Control (MAC) Protocol Specification; Release 8; 2009.

NPL_17_3GPP TR 36.331 v8.5.0; 3rd Generation Partnership Project; Technical Specification Group Radio Access Network, Evolved Universal Terrestrial Radio Access (E-UTRA); Radio Resource Control (RRC) Protocol Specification; Release 8; 2009.

* cited by examiner

SYSTEM AND METHOD FOR INTRA-CELL FREQUENCY REUSE IN A RELAY NETWORK

BACKGROUND

The present invention relates generally to data transmission in mobile communication systems and more specifically to a system and method for intra-cell frequency reuse in a communications network including one or more relay nodes.

As used herein, the terms "user equipment" and "UE" can refer to wireless devices such as mobile telephones, personal digital assistants (PDAs), handheld or laptop computers, and similar devices or other User Agents ("UAs") that have telecommunications capabilities. A UE may refer to a mobile, or wireless device. The term "UE" may also refer to devices that have similar capabilities but that are not generally transportable, such as desktop computers, set-top boxes, or network nodes.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" or "access device" will refer to any component, such as a traditional base station or an LTE or LTE-A base station (including eNBs), that can provide a UE with access to other components in a telecommunications system.

In mobile communication systems such as E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a scheduling channel on the Physical Downlink Control CHannel (PDCCH). In some cases, control information is communicated from the UE to the base station using the Physical Uplink Control CHannel (PUCCH) or PUSCH.

Generally, communications between a base station and UE are contained within one or more resource blocks (RBs). The RBs provide a structure for encapsulating data within particular timeslots or symbols that are transmitted by either the base station or UE at particular times. An exemplary RB may include, for example, several Resource Elements (REs) that are arranged in frequency columns and time rows as known in the art. In that case, each RE corresponds to a different time/frequency combination for data to be transmitted between a base station and UE.

Hybrid Automatic Repeat reQuest (HARQ) is a scheme for re-transmitting a traffic data packet to compensate for an incorrectly received traffic packet that is communicated between a base station and UE. A HARQ scheme may be used both in uplink and downlink. Take downlink transmissions for example, for each downlink packet received by a UE, a positive acknowledgment (ACK) is transmitted on, for example, a PUCCH, from the UE to the base station after a cyclic redundancy check (CRC) performed by the UE indicates a successful decoding. If the CRC indicates a packet is not received correctly, a UE HARQ entity transmits a negative acknowledgement (NACK) on, for example, the PUCCH, in order to request a retransmission of the erroneously received packet. Once a HARQ NACK is transmitted to a base station, the UE waits to receive a retransmitted traffic data packet. When a retransmission request is received at a base station, the base station retransmits the incorrectly received packet to the UE. This process of transmitting, ACK/NACK and retransmitting continues until either the packet is correctly received or a maximum number of retransmissions has occurred.

In some LTE radio access networks (RANs), relay nodes (RNs) may be incorporated into the network to improve cell edge performance and increase average cell throughput. For example, FIG. 1 is an illustration of an exemplary network architecture including RNs positioned around a cell edge. As shown in FIG. 1, network 100 includes base stations 102 and 104. Base stations 102 and 104 are each in communication with mobile management entity (MME)/serving gateway (SGW) 106 and 108 for providing core network functionality. In some cases, one or more UEs (e.g., UE 110) may be in direct communication with either of base stations 102 and 104 (either concurrently or at different times). In other cases, however, when one or more UEs cannot establish a strong connection with either base station 102 or 104, the UEs may, instead, communicate using one or more of RNs 112, 114, 116, or 118. For example, as shown in FIG. 1, UEs 120, and 122 are each communicating with an RN rather than a base station directly. When communicating with an RN, the data the RN receives from the UE is forwarded to an available base station for processing. Conversely, data received by an RN from a base station that is allocated to a particular UE is forwarded to that UE by the RN. Accordingly, in this configuration, UEs may be able to access network resources at a higher data rate and/or with lower power consumption using RNs.

Different types of RNs may be defined depending upon the functional capabilities of the RN. A Type I RN is essentially a small base station with a lower transmit power, e.g., 30 dBm, and in-band wireless backhaul. Conversely, a Type II RN does not create a new cell and only facilitates data transmission and reception for a particular base station. Generally, Type II relays do not have a separate Physical Cell ID and do not create any new network cells. Also, Type II relays are transparent to Rel-8 UEs. As such, a Rel-8 UE is not aware of the presence of a type II RN. Type II RNs can transmit PDSCH, but do not transmit cell-specific reference signals (CRS) or a PDCCH. CRS may be used by a UE communicating with a base station to determine channel characteristics and to allow the base station to schedule packet transmissions according to those channel characteristics. By comparing a received CRS to known reference signals (i.e., known data), a UE can determine channel characteristics (e.g., a channel quality index, etc.). The difference between the known data and the received signal may be indicative of signal attenuation, path-loss, interference level, noise, etc.

When implementing networks incorporating RNs, it may be possible to provide more efficient coverage and/or higher capacity if one or more of the base station and associated RNs can each use the same resources simultaneously to provide services to connected UEs. If the radio coverage of the RNs and base station overlap, however, it may be difficult to reuse resources as the overlapping coverage may result in significant interference.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
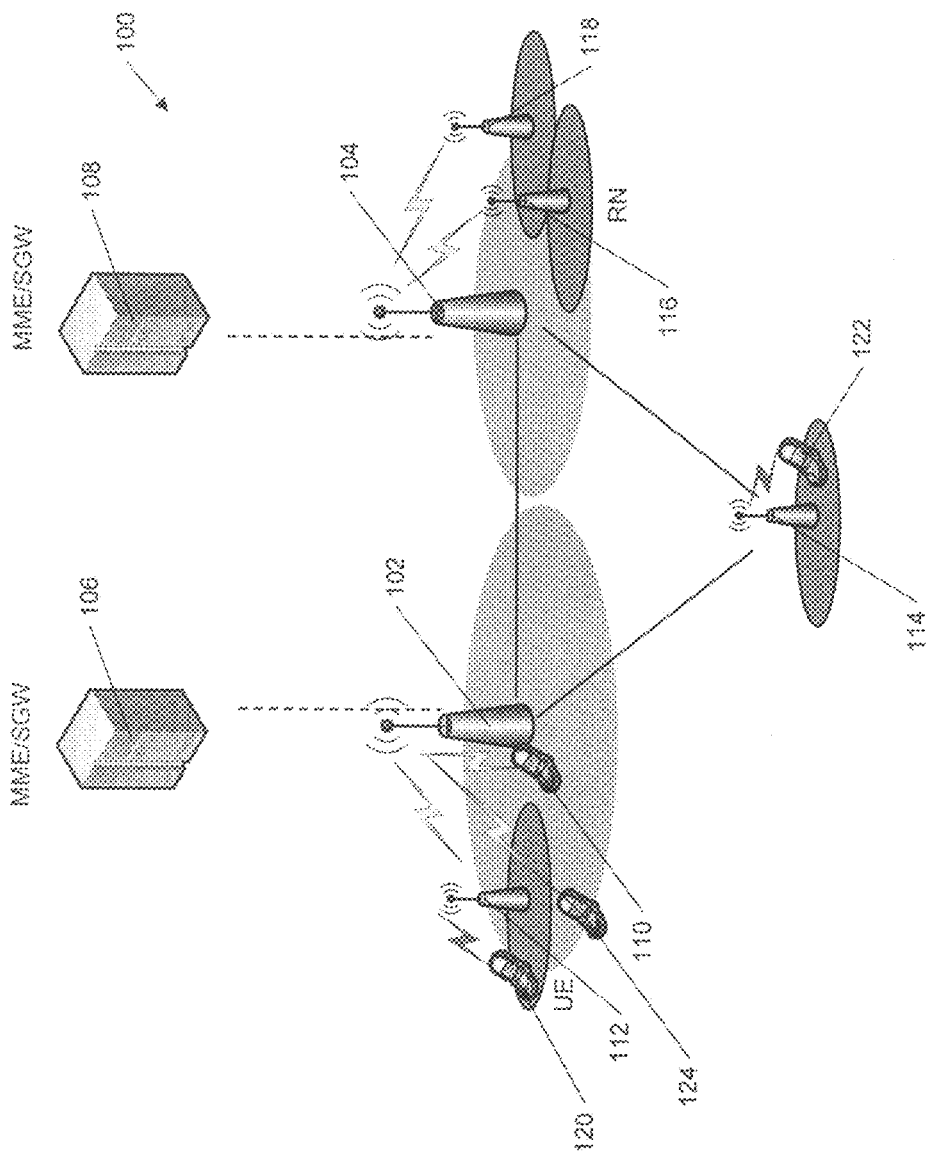
FIG. 1 is an illustration of an exemplary LTE-A network architecture including relay nodes (RNs) positioned around a cell edge.

The present invention relates generally to data transmission in mobile communication systems and more specifically to a system and method for intra-cell frequency reuse in a communications network including one or more relay nodes.

Some implementations include a method for communicating using a wireless communication network. The method includes receiving a channel quality indicator (CQI) from a first UE. The first UE is served by a base station. The CQI characterizes a channel quality between the first UE and the base station when the base station transmits at a high power. The method includes determining a first modulation and coding scheme (MCS) when the base station transmits at a low power based on the received CQI, and, when the spectrum efficiency of the first MCS is equal to or higher than the spectrum efficiency of a pre-determined MCS, communicating with the first UE using a low power transmission.

Other implementations include a method for communicating using a wireless communication network. The method includes receiving a first sounding reference signal (SRS) from a first UE, and receiving a second SRS forwarded from a relay node (RN). The second SRS is the first SRS as observed by the RN. The method includes using the first and second SRS to determine a pathloss difference of the pathloss between the first UE and the base station and the pathloss between the first UE and the RN, and transmitting the pathloss difference to the first UE.

Other implementations include a method for communicating with at least one of a base station and a relay node (RN) using a wireless communications network. The method includes transmitting a first sounding reference signal (SRS) to the base station, and receiving a pathloss difference of the pathloss between a first user equipment (UE) and the base station and the pathloss between the first UE and the RN.

Other implementations include a base station for communicating using a wireless communication network. The base station includes a processor configured to receive a channel quality indicator (CQI) from a first UE. The first UE is served by the base station. The CQI characterizes a channel quality between the first UE and the base station when the base station transmits at a high power. The processor is configured to determine a first modulation and coding scheme (MCS) when the base station transmits at a low power based on the received CQI, and, when the spectrum efficiency of the first MCS is equal to or higher than the spectrum efficiency of a pre-determined MCS, communicate with the first UE using a low power transmission.

Other implementations include a user equipment (UE) for communicating with at least one of a base station and a relay node (RN) using a wireless communications network. The UE includes a processor configured to transmit a first sounding reference signal (SRS) to the base station, and receive a pathloss difference of the pathloss between the UE and the base station and the pathloss between the UE and the RN.

Other implementations include a method for communicating using a wireless communications network. The method includes broadcasting a first transmission to a UE. The UE is associated with a relay node (RN). The method includes at least one of receiving a first acknowledgement/non-acknowledgement (ACK/NACK) message from the UE, the first ACK/NACK being transmitted within a first resource in an uplink control channel and being responsive to the first transmission, and receiving a second ACK/NACK message from the RN, the second ACK/NACK being transmitted within a second resource in an uplink control channel and being responsive to the first transmission, the second resource being different from the first resource.

Other implementations include a communication system for communicating with a user equipment (UE). The communication system includes a base station including a first processor configured to transmit a first message to the UE. The communication system includes a relay node (RN) in communication with the base station and the UE. The RN includes a second processor configured to receive the first message, and, when the UE fails to decode the first message, transmit the data portion of the first message to the UE.

Other implementations include a base station for communicating using a wireless communications network. The base station includes a processor configured to broadcast a first transmission to a UE. The UE is associated with a relay node (RN). The processor is configured to, at least one of, receive a first acknowledgement/non-acknowledgement (ACK/

NACK) message from the UE, the first ACK/NACK being transmitted within a first resource in an uplink control channel and being responsive to the first transmission, and receive a second ACK/NACK message from the RN, the second ACK/NACK being transmitted within a second resource in an uplink control channel and being responsive to the first transmission, the second resource being different from the first resource.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

To significantly increase the system capacity and coverage in a Type II relay network, the network may be configured for intra-cell frequency reuse. Typically an RN transmits at a low power and covers a limited area. If there are multiple RNs in a cell that are each separated and have no coverage overlap, it is possible to schedule the multiple RNs to reuse the same resource blocks (RBs), while creating only negligible cross interference. To further increase the capacity, the frequency reuse can occur among multiple RNs and the base station. To minimize the interference to the RN-served UEs, the base station may serve cell-center UEs with low-power data transmissions or mute the resources taken by the RNs. In a typical Type II relay network, PDCCH and CRS are transmitted from the base station. In that case, RN-served UEs receive PDCCH from the base station and PDSCH from the base station and/or the RN. However, base station-served UEs may receive both PDCCH and PDSCH from the base station.

In a particular network, each UE may be associated with a network node (e.g., either a base station or RN) from which the UE observes the strongest downlink (DL) signal. To ensure the UE is associated with the appropriate node (either the base station or an RN), a base station may need to access information describing the radio conditions observed by a particular UE from the base station on the DL and/or the radio conditions observed by RNs on the UL.

Because Type II RNs do not send CRSs which would otherwise be used to estimate the channel strength between the UE and a network node, the UE may associate with a network node based upon the uplink (UL) sounding reference signal (SRS) transmission or other UL transmissions received by the RN such as PUSCH transmissions or random access preamble transmissions in place of the CRS. To assist in network management, RNs may forward the received SRS signal strengths averaged over a time period to the base station. Accordingly, after receiving the reports from the RN, the base station is able to determine the relative DL signal strengths observed by the UE from both the base station and available RNs. In response, the base station may adjust the received SRS signal strengths by the transmit power difference between the base station and RN.

For example, assuming the received UL SRS strengths at the base station and RN are R0 and R1 (note that the values may, in some cases, be averaged over a time period), respectively, and that the DL transmitting powers from the base station and RN are P0 and P1, respectively (the typical values of P0 and P1 could be 46 dBm and 30 dBm, for example). If R1>R0+P0−P1, the UE may be associated with the RN. If R1<=R0+P0−P1, the UE may be associated with the base station. In some cases, the UE may be assigned to multiple RNs if the UE observes strong DL signals from multiple RNs. In that case, the base station signals each RN with the UE IDs that are associated with the RN via higher layer signaling over backhaul (e.g., radio resource control (RRC) signaling or X2-based signaling). As UEs move around, the RN may periodically forward the received SRS strengths to the base station so that the base station can re-associate the UE to the appropriate RN. The base station may be configured to signal the UE if the UE is associated with an RN on DL.

In one example, it is assumed that a UE is at the edge of a first Cell 1 and is very close to an RN in a neighboring Cell 2. If the RN observes a strong SRS from the UE (assuming the RN is aware of the SRS configuration of the UE), the RN may report the received SRS strength to the base station of Cell 2. The base station of Cell 2 could then forward the SRS report to the base station in Cell 1. The base station of Cell 1 may then decide to handover the UE to Cell 2 and the UE could be associated with the RN. As such, the UE may then become associated with the network node from which the UE observes the strong radio signal.

For a base station-served UE, the base station may further classify the UE to be cell-center (see, for example, UE 110 of FIG. 1) or cell-edge UE (see, for example, UE 124 of FIG. 1), as described below. If the UE is at the cell center, the UE can be co-scheduled with RN-served UEs, with each grouping of UEs sharing the same RBs. In that case, the base station transmits at a low power spectral density (PSD) to minimize interference to the RN-served UEs. If the UE is at the cell edge of base station coverage, the base station would otherwise be required to transmit at a high PSD causing interference with the RNs. In that case, the cell-edge UE that is served by the base station cannot be co-scheduled with RN-served UEs. In one example implementation, the base station is configured to transmit at 46 dBm and 30 dBm for the high and low-power mode, respectively. In another embodiment, low power mode could be 37 dbm. In yet another embodiment, low power mode could mean the transmission power lower than 46 dBm. The corresponding high and low PSD levels are 46 dBm and 30 dBm divided by the system bandwidth. In another scenario, for the UEs that are at the border of RN's coverage but are still associated with the RN, the base station may mute the resources allocated to those UEs.

In one implementation, the base station notifies UEs of whether they are cell-center UEs. The notification may be made on DL via, for example, RRC signaling or media access control (MAC) control elements. Furthermore, for a cell-center, base station-served UE, two transmission modes are possible (e.g., a high PSD transmission mode and low PSD transmission mode). In that case, the base station signals the mode information to the UE. As described below, the downlink control information (DCI) in PDCCH to the cell-center UE may have one additional bit to indicate whether the transmission mode is high PSD or low PSD. In some embodiments, this information could also be semi-statically signaled to the UE via high layer signaling such as RRC signaling or MAC control elements. In some other embodiments, the information may derived by the UE using a predetermined algorithm or collection of rules.

Figure 2:
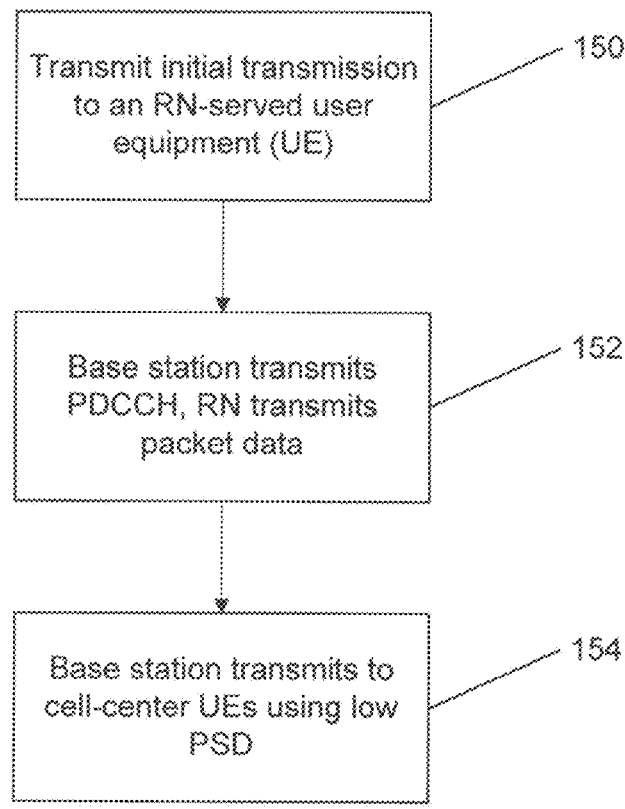
FIG. 2 is an illustration of an exemplary DL transmission scheme with intra-cell frequency reuse.

FIG. 2 is an illustration of an exemplary DL transmission scheme with intra-cell frequency reuse. In step 150, in order to communicate with an RN-served UE, the base station transmits an initial transmission to the RN-served UE. Both the UE and the RN monitor PDCCH, decode the packet. The UE will send an ACK/NACK back to the base station.

In step 152, if the RN has decoded the packet successfully, but the UE has not. In this example, on the subframe allocated for retransmissions, the base station is the only network node to send the PDCCH while the RN sends the packet data. Accordingly, the UE receives the PDCCH from the base station and the PDSCH from the RN. The base station stops sending PDSCH to the UE after the RN has successfully decoded the packet.

In step 154, using the same resource blocks that the RN uses to send packets to its UEs, the base station can transmit to the cell-center UEs with a low PSD and other RNs may also transmit to their UEs simultaneously. Due to the absence of CRS from the RNs, to facilitate data demodulation at the RN-served UEs, DRS may be assumed for the transmissions from the RN to the UE.

To minimize the potential traffic bottleneck on the backhaul links used by the RNs to communicate with the base station directly, advanced schemes such as Spatial-Division Medium Access (SDMA) could be employed so that the base station can communicate with multiple RNs simultaneously. Other advanced schemes on backhaul could be multiple-input, multiple-output (MIMO) transmissions to increase the capacity of the link from the base station to the RN.

RN-served UEs may operate in several different configurations. In a first configuration, the PDCCH may always be scrambled using the UE's Cell Radio Network Temporary Identifier (C-RNTI). The PDCCH for the initial transmission is targeted to reach the RN and may or may not reach the UE. For example, a low Control Channel Element (CCE) aggregation level for PDCCH could be used if the RN is closer to the base station to free-up resources in the control region. After the RN decodes the packet, the PDCCH may be targeted to the UE (e.g., use a sufficient CCE aggregation level to reach UE). Because the UE may not be able to receive the initial transmission due to the missing PDCCH, the base station may start the Hybrid Automatic Repeat Request (HARQ) redundancy version from 0 at the 2nd transmission (or after the RN has decoded the packet) so that the UE could receive the systematic information bits. Usually the systematic information bits in redundancy version 0 are important for packet decoding.

In a second mode of operating RN-served UEs, it may be assumed that the PDCCH is always scrambled with UE's C-RNTI and the PDCCH is always targeted to reach the UE (e.g., use the sufficient CCE aggregation level to reach UE). In that case, there is no need for the base station to restart the redundancy version on the 2nd retransmission (or after the RN has decoded the packet) as the UE should be able to receive the data signal on the initial transmission although it may not be good enough to decode the data.

The PDCCH of the initial transmission may be scrambled with the RN's C-RNTI and the PDCCH of retransmissions may be scrambled with UE's C-RNTI. Because the UE will not receive the initial transmission, the base station may be configured to start HARQ redundancy version from 0 at the 2nd transmission (or after the RN has decoded the packet) so that the UE could receive the systematic information bits.

In LTE Rel-8, adaptive asynchronous HARQ may be used on the DL, which means that both the retransmission timing and the retransmission Modulation and Coding Scheme (MCS) are dynamically scheduled by the base station via PDCCH. Typically the RN is half duplex so that on a particular frequency the RN either receives or transmits at a given time. Within one subframe, therefore, it can be difficult for the RN to monitor the PDCCH region during the first few OFDM symbols (for example, one OFDM symbol) and perform the retransmission according to PDCCH in the remaining OFDM symbols due to minimal switching time from the receiving to transmitting mode and little time for the RN to decode the PDCCH. To minimize this difficulty the retransmission timing may be pre-configured. In that case, the base station still uses PDCCH to notify the UE about the retransmission information (as in Rel-8), but the resource allocation information and the MCS information contained in the PDCCH signaling is the same as the initial transmission. Accordingly, the RN does not need to read the PDCCHs for the retransmissions. For the first mode of operation of the RN-served UEs described above, if the RN decodes the packet at the initial transmission, the base station may use (0, 0, 2, 1, 3, 0, 2, 1, 3 . . . ) as the sequence of HARQ redundancy versions.

Alternatively, the base station may send scheduling information (the subframe index for retransmission, resource allocation and MCS etc.) to the RN in advance. On the retransmission subframe, the base station may send the PDCCH and the RN will send the data. This implementation achieves the scheduling flexibility of adaptive asynchronous HARQ at the expense of the additional signaling between the base station and RN. For Type II RNs that transmit CRS, the PDCCH and PDSCH may be both sent from the RN with the base station not handling packet retransmission.

For a base station-served UE, the base station is configured to determine whether the UE is a cell-center or cell-edge UE. The base station may co-schedule cell-center UEs with RN-served UE on the same resource blocks via frequency reuse, but cannot do so for cell-edge UEs that are served by the base station where the transmission may interfere with one or more RN. Accordingly, the base station may be required to determine whether a particular base station-served UE is a cell center UE, or a cell edge UE. The same classification may also apply to the UEs associated with the RN. For the RN-edge UEs associated with a RN, the base station may need to mute resources allocated to those UEs.

Figure 3:
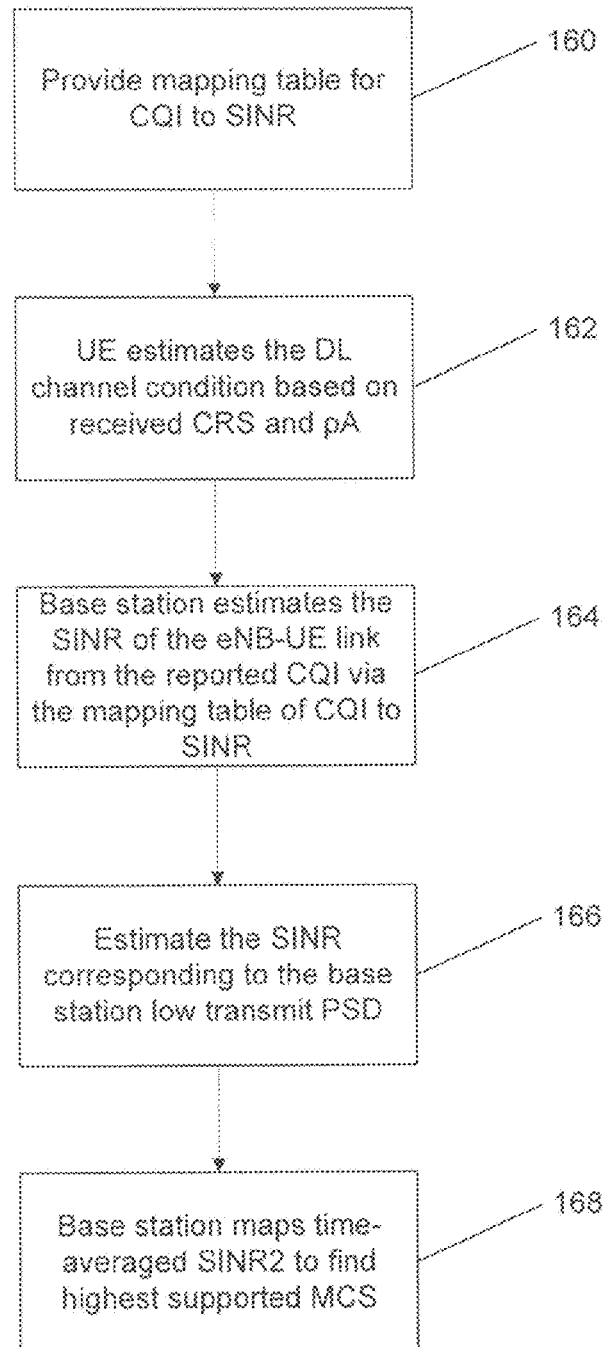
FIG. 3 is an illustration of an exemplary method for classifying cell-center UEs versus cell-edge UEs in downlink (DL) communications.

FIG. 3 is an illustration of an exemplary method for classifying cell-center UEs versus cell-edge UEs in DL communications. In the example, in step 160, the base station establishes a mapping table between Channel Quality Indicator (CQI) and Signal to Interference and Noise Ratio (SINR). Generally, however, any channel indicator may be mapped to any value that indicates a signal level between one or more components of the wireless networks. In this example, the SINR value in the mapping table is the required SINR to support the various MCS that correspond to a particular CQI. For an LTE/LTE-A system, the SINR value in the mapping table could be the lowest SINR to support the MCS achieving 10% Frame Error Rate (FER) after the 1st transmission, for example. Alternatively, the SINR value in the mapping table could be the medium value of the SINRs that could support the MCS achieving 10% FER after the 1st transmission.

In step 162, the UE estimates the DL channel condition based on CRS and $\Sigma_A$. The UE may then reports the CQI to the base station. $\rho_A$ is a UE-specific parameter specified in Rel-8 that indicates the ratio of PDSCH Energy per Resource Element (EPRE) to CRS EPRE. The CQI corresponds to the CQI when the base station transmits at a high power.

In step 164, the base station estimates the SINR of the base station-UE link from the reported CQI via the mapping table of CQI to SINR. The SINR estimate is denoted as $SINR_1$.

In step 166, the SINR corresponding to the base station low transmit PSD can be estimated as $SINR_2=SINR_1*\rho_{A,LP,max}/\rho_A$, where $\rho_{A,LP,max}$ is the ratio of PDSCH EPRE to CRS EPRE assuming the total base station power in the low transmit power mode (e.g. 30 dBm) is evenly distributed over the whole system bandwidth. Furthermore, an offset value of delta can be deducted from SINR2 to count for the interference from the RN transmissions to the UE. In some cases, different values for $\rho_A$ for UEs in high power and low power are provided by the base station as the base station is aware of the power level of UEs and can adjust $\rho_A$ correspondingly.

In step 168, with the mapping table established in step 160, the base station may map the time-averaged $SINR_2$ (to remove the effect of fast fading) and find the highest supportable MCS. If the UE can support the lowest MCS level (e.g., the lowest MCS level specified by Rel-8) or a certain predetermined or pre-defined MCS level when the base station transmits at a low power, the user is classified as a cell-center UE. Otherwise the UE may be classified as a cell-edge UE. Alternatively, the base station may compare a spectral efficiency of the lowest MCS level to the spectral efficiency of the certain MCS level to determine whether the UE is a cell-center UE and to determine a power level to use when communicating with the UE.

For improved interference management and CQI estimation, a semi-static configuration of intra-frequency reuse may be coordinated among neighboring cells. The configuration of such a coordination may be communicated among the neighboring cells via the X2 interface, for example. As an example, assume Cell α has two neighboring cells β and γ. In that case, the system bandwidth may be divided into three parts, f1, f2, and f3. Cell α uses f1 for intra-cell frequency reuse with the base station transmitting at a low PSD. Similarly, Cells β and γ use f2 and f3 for intra-cell frequency reuse with the base station in low PSD mode, respectively. Alternatively, the available system bandwidth may be divided into 4 parts where 3 of the bands are configured as described above. In that case, the fourth part of the bandwidth can be used by the base stations for transmitting at either high PSD or low PSD.

Network cells can use a pre-defined configuration for the frequency reuse pattern or, separately or in combination, the network cells can use distributed or centralized Self-Optimized Network (SON) techniques to converge to a reuse pattern. For example, each cell can send the planned PSD for a region of the band or for each RB to the cell's neighbors. The cell can then adjust the cell's PSD on the next transmission when the cell receives the planned PSD from the cell's neighbors. Alternatively, the cells may transmit the planned PSD or an indicator to enable intra-cell frequency reuse to a central coordinator. The central coordinator can then determine an appropriate reuse pattern to use and send the reuse pattern to the cells.

For cell-center UEs, the base station may transmit at a high PSD or a low PSD on PDSCH depending upon whether the cell-center UE is co-scheduled with RN-served UEs (note that CRS is always transmitted on high PSD no matter whether the transmission scheme is high PSD or low PSD on PDSCH). If the cell-center UE is co-scheduled with RN-served UEs, the base station may use a low PSD. If, however, the cell-center UE is not co-scheduled with RN-served UEs, the base station may use either a low or a high PSD. The switch between high and low PSD modes on PDSCH may occur from subframe to subframe.

For the UE to demodulate the received data, the UE needs to know the power ratio of PDSCH to CRS. Therefore, similar to the values $\rho_A$ and $\rho_B$ that describe ratios of PDSCH EPRE to CRS EPRE in OFDM symbols with and without CRS, respectively, with the base station in high PSD mode, two corresponding quantities $\rho_{A,LP}$ and $\rho_{B,LP}$ are defined to indicate the ratios of PDSCH EPRE to CRS EPRE in OFDM symbols with and without CRS for the low PSD mode.

The value of $\rho_{A,LP}$ may be determined as follows. $\rho_{A,LP}$ may be set to $\rho_{A,LP,max}$ (as described above). Alternatively, $\rho_{A,LP}$ is initially set to $\rho_{A,LP,max}$ and then, if necessary, $\rho_{A,LP}$ is reduced according to an outer-loop adjustment. For example, if the FER of the highest MCS is less than a particular value (e.g., 10% or 1%) after the 1st transmission, $\rho_{A,LP}$ may be reduced. After $\rho_{A,LP}$ is determined, $\rho_{B,LP}$ can be determined using $\rho_{B,LP}=P_B*\rho_{A,LP}$ where $P_B$ is a Rel-8 cell-specific parameter configured by higher layers. The value of $\rho_{A,LP}$ may then be conveyed to the UE via RRC signaling, for example. In some cases, instead of using $\rho_{A,LP}$ and $\rho_{B,LP}$, different values for $\rho_A$ and $\rho_B$ for UEs in high power and low power are provided by the base station as the base station is aware of the power level of UEs and can adjust $\rho_A$ and $\rho_B$ correspondingly. The updates on $\rho_A$ and $\rho_B$ could be signaled to the UE via high layer signaling such as RRC signaling or MAC control elements.

To allow the cell-center UE to know whether the packet transmission is to be in high PSD or low PSD mode, a bit indicator may be added to the PDCCH DCI. In that case, the UE uses the appropriate power ratios of PDSCH to CRS for data demodulation. For example, when the power mode indicator is set to 1, the UE may be in high PSD mode. When the power mode indicator is set to 0, the UE may be in low PSD mode. A default value may be established so that the UE is in the high PSD mode by default. In that case, whenever the power mode indicator is swapped from 0 to 1 or from 1 to 0, the UE may change from high PSD mode to low PSD mode.

Upon receiving an initial transmission from a base station, both the receiving UE and RN may send an acknowledgement or negative acknowledgement (ACK/NACK) to the base station. Because the ACK/NACK may be transmitted by both the UE and RN at the same time, there is a possibility that the two transmissions may destructively interfere with one another. Accordingly, it may be necessary to ensure that the ACK/NACKs transmitted by the UE and RN use distinct resources on PUCCH to avoid collision.

Figure 4:
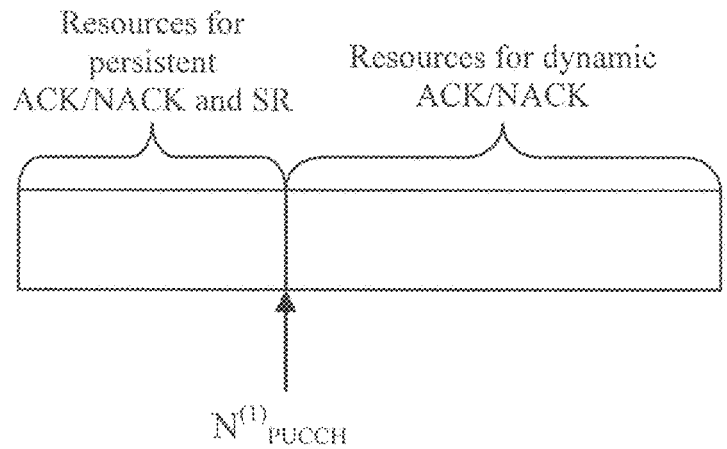
FIG. 4 is an illustration of an exemplary configuration of resources for PUCCH format 1/1a/1b used to transmit the uplink ACK/NACK in existing networks implementing LTE-8.

In LTE Rel-8, the UE may generally use PUCCH resource $n_{PUCCH}^{(1)}$ for transmission of HARQ ACK/NACK in subframe n. For PDSCH transmissions indicated by the detection of a corresponding PDCCH in subframe n−4, the UE may use $n_{PUCCH}^{(1)} = n_{CCE} + N_{PUCCH}^{(1)}$, where $n_{CCE}$ is the number of the first CCE used for transmission of the corresponding PDCCH DCI assignment and $N_{PUCCH}^{(1)}$ is configured by higher layers. For a PDSCH transmission where there is no corresponding PDCCH detected in subframe n−4 (e.g. semi-persistent PDSCH transmissions), the UE may use $n_{PUCCH}^{(1)} = n_{PUCCH,HighLayer}^{(1)}$, where $n_{PUCCH,HighLayer}^{(1)}$ is determined according to higher layer configuration. For example, FIG. 4 is an illustration of an exemplary configuration of resources for PUCCH format 1/1a/1b used to transmit the uplink ACK/NACK in existing networks implementing LTE-8. Unfortunately, when ACK/NACK transmissions are sent by both the UE and RN at the same time, a potential collision condition exists. Accordingly, the present system and method allow for the ACK/NACK transmissions of both the UE and RN to be offset or otherwise distinguished from one another to minimize collisions.

Figure 5:
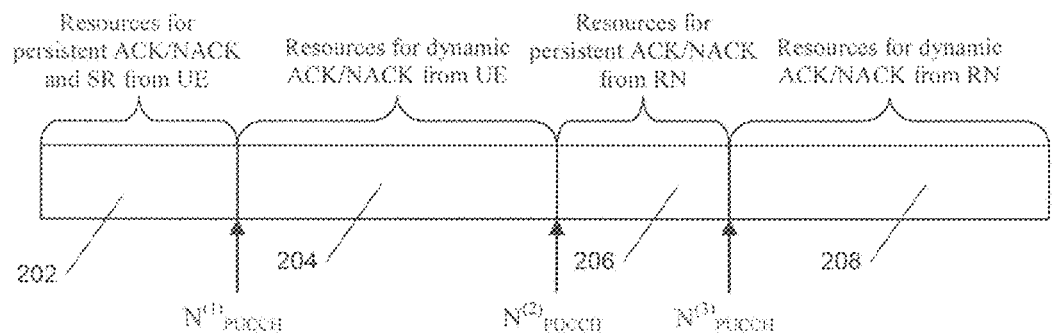
FIG. 5 is an illustration of an exemplary ACK/NACK resource configuration to minimize collisions between ACK/NACK transmissions of a UE and an RN.

In one example, to avoid the ACK/NACK collision between transmissions from both the RN and UE, the UE may be configured to use the same PUCCH resources as in Rel-8 while the RNs transmit ACK/NACK on PUCCH resources as follows. The RN is allocated PUCCH resource $n_{PUCCH,RN}^{(1)}$ for transmission of HARQ ACK/NACK in subframe n. For a PDSCH transmission indicated by the detection of a corresponding PDCCH in subframe n−4, the RN may be configured to use $n_{PUCCH,RN}^{(1)} = n_{CCE} + N_{PUCCH}^{(3)}$, where $N_{PUCCH}^{(3)}$ is configured by higher-layer signaling. The value of $N_{PUCCH}^{(3)}$ may be set based upon the maximum number of resources for persistent ACK/NACK, scheduling request (SR) and dynamic ACK/NACK from UEs and persistent ACK/NACK from RNs. The value of $N_{PUCCH}^{(3)}$ may be conveyed to RNs by RRC signaling or System Information Blocks (SIBs) or even pre-configured, for example. For a PDSCH transmission where there is no corresponding PDCCH detected in subframe n−4, the RN may use $n_{PUCCH,RN}^{(1)} = n_{PUCCH,HighLayer}^{(1)} + N_{PUCCH}^{(2)}$, where $N_{PUCCH}^{(2)}$ is configured by higher-layers. The value of $N_{PUCCH}^{(2)}$ may be set based on the maximum number of resources for the persistent ACK/NACK, SR and dynamic ACK/NACK from UEs. The value of $N_{PUCCH}^{(2)}$ can be conveyed to RNs by RRC signaling or SIBs or even pre-configured, for example. FIG. 5 is an illustration of an exemplary ACK/NACK resource configuration to minimize collisions between ACK/NACK transmissions of a UE and an RN. As seen in FIG. 5, in the present scheme, resource that are made available for UE ACK/NACK transmissions are separated from those allocated for RN ACK/NACK transmissions. Resource 202 is allocated for persistent ACK/NACK in addition to SR for the UE and resource 204 is allocated for dynamic ACK/NACK responses issued from the UE. Resource 202 is allocated within $N_{PUCCH}^{(1)}$ and is offset from the resources allocated for the RN. Again referring to FIG. 5, resource 206 is allocated for persistent ACK/NACK and SR for the RN and resource 208 is allocated for dynamic ACK/NACK responses. Resource 204 is allocated within $N_{PUCCH}^{(2)}$ and resource 206 is allocated within $N_{PUCCH}^{(3)}$. Accordingly, ACK/NACK transmissions, whether made using persistent or dynamic resources are offset between the UE and the RN.

Alternatively, to minimize ACK/NACK collisions for transmissions for both UEs and RNs, the RN may be configured to not send ACK/NACK transmissions. In that case, the base station is configured to assume that the RN can always decode the transmitted packet after the initial transmission. If the UE does not decode the packet after the initial transmission, the base station sends PDCCH only on the subframes of retransmissions and expects the RN to attempt to resend the data, possibly using the allocated resource. If neither the RN nor UE decodes the packet at the initial transmission, the base station may resend the packet after the maximum number of retransmissions has been reached. In this implementation, the base station may be configured to use a conservative MCS to ensure a very high probability that the RN is able to successfully receive and decode the packet at the initial transmission.

Alternatively, the base station may send the packet grant information on PDCCH dedicated to the RN using the RN-ID instead of UE-ID. In that case, the UE will not detect any grant on PDCCH and will not send any ACK/NACK in response. There will not be any ACK/NACK resource collision in this case.

Alternatively, a dedicated channel may also be assigned to the RN to deliver the ACK/NACK information back to the base station ensuring there is no collision with ACK/NACK information transmitted by the UE. The dedicated channel may be a physical channel with the ACK/NACK linked to the DL transmission in an explicit way or an implicit way, for example, by a pre-configured timing relationship. The RN may alternatively deliver the ACK/NACK information to the base station by a MAC control element or high-layer signaling. Information such as the index of the transport block (TB) or the lowest PRB index of PDSCH may be included in the signaling so that the base station can correctly link the HARQ feedback with the DL transmission.

In existing Type II relay networks, CRS may only be transmitted by the base station, without any CRS transmissions being broadcast from RNs. When the RN sends data to UEs, the RN is generally configured to blank resource elements of CRS. Therefore, when the base station-served UE estimates the CQI from CRS, the UE takes into account the interference from the neighboring base station and inter-cell RNs but does not take into account interference from intra-cell RNs. Because the intra-cell RN interference is unmeasured, the interference cannot be compensated for resulting in an inability to perform accurate link adaptation.

In the present system, for base station-served cell-center UEs using low PSD transmit mode, as described above, the UE may be configured to derive the CQI of low PSD mode based upon the CQI of high PSD mode. Therefore the estimated CQI of low PSD mode does not consider the interference from the intra-cell RNs.

In the case of RN-served UEs, the base station may derive the CQI of RN-UE link based on the CQI of the base station-UE link. In that case, the base station may estimate the SINR of the RN-UE link via scaling the base station-UE SINR by the large-scale pathloss difference between the base station-UE and RN-UE links and the transmit power difference between the base station and the RN. Therefore, the estimation of CQI for the RN-UE link may not consider the intra-cell base station/RN interference.

To mitigate these estimation problems, an outer loop may be applied to further adjust the MCS. For example, for each base station-served cell-center UE, the base station may separately collect long-term averaged FER statistics and HARQ termination statistics for the packets transmitted with the low and high PSD mode. Similarly, for each RN-served UE and base station-served cell-edge UE, the base station may collect the long-term averaged FER statistics and HARQ termination statistics. The long-term average may then be a window based moving average. Assuming that the MCS selection is targeted for x % FER after N transmissions, if the actual observed average FER after N transmissions is higher than x % the base station may use a lower MCS. Otherwise a higher MCS should be used. The adjustment could be achieved by tuning MCS directly (MCS plus/minus a delta value) or by adjusting the estimated SINR (SINR plus/minus a delta value) to map to a MCS. After the outer loop MCS adjustment, if the base station-served cell-center UE cannot support the lowest MCS (e.g., the lowest MCS level specified in Rel-8) in the low PSD mode, the UE may be classified as a cell-edge UE. Similarly, after the MCS adjustment, if the RN-served UE cannot support the lowest MCS, the UE may switch to being base station-served. Alternatively, the base station may compare a spectral efficiency of the lowest MCS level to the spectral efficiency of the certain MCS level to determine whether the UE is a cell-edge UE and to determine a power level to use when communicating with the UE.

Alternatively, an improved CQI estimation may be obtained by estimating the intra-cell interference. In that case, the RN may report the received UE PUSCH power to the base station. The base station can then estimate the pathloss from the RN to UE via, for example, Power Headroom (PHR). If the base station is aware of the RN transmission power, the base station can then estimate the interference power from the RNs to the UE. Similarly the base station may know the pathloss from the base station to UE using PHR and estimate the interference from the base station to the RN-served UEs. Accordingly, the base station may determine an improved MCS estimation considering the intra-cell interference from base stations and RNs.

In the case of UE UL communications, each UE may be assigned to the base station or an RN. The assignment may be based on the pathloss experienced between the UE and base station and the UE and RN. The pathloss can be derived from the uplink SRS transmission or other uplink transmissions such as PUSCH transmission and random access preamble transmissions. The RNs may forward the received SRS signal strengths averaged over a time period to the base station for analysis. If the base station observes a stronger SRS, the UE may be associated with the base station. Otherwise the UE may be associated with the RN. The UE may alternatively be assigned to multiple RNs if multiple RNs see strong SRSs from the UE. The base station may signal each RN with assigned UE IDs on UL using, for example, RRC signaling. After processing the pathloss measurements, the base station can signal the UE to indicate whether the UE is to be associated with a RN on UL or with the base station.

For a base station-served UE, the UE may be classified as one of a cell-center or cell-edge UE. For UL, the same procedure as that described for DL above may be used to determine whether a UE is cell-center or cell-edge. However, in the UL case, $\rho_{A,LP,max}$ may be equal to the power ratio of PDSCH to CRS assuming that the base station transmit power is the same as the RN transmit power. If the UE is at the cell center, the UE may be co-scheduled with RN-served UEs on the same resource blocks because the cell-center UE is configured to transmit at a low PSD thereby creating minimal interference to RN-served UEs. If, however, the UE is at the cell edge, the UE cannot be co-scheduled with the RN-served UEs as the cell-edge UE will be transmitting at a high PSD and may, therefore, interfere with the RN-served UEs. The base station may notify a UE of whether it is a cell-center base station-served UE on UL or a cell-edge UE using, for example, RRC signaling.

Figure 6:
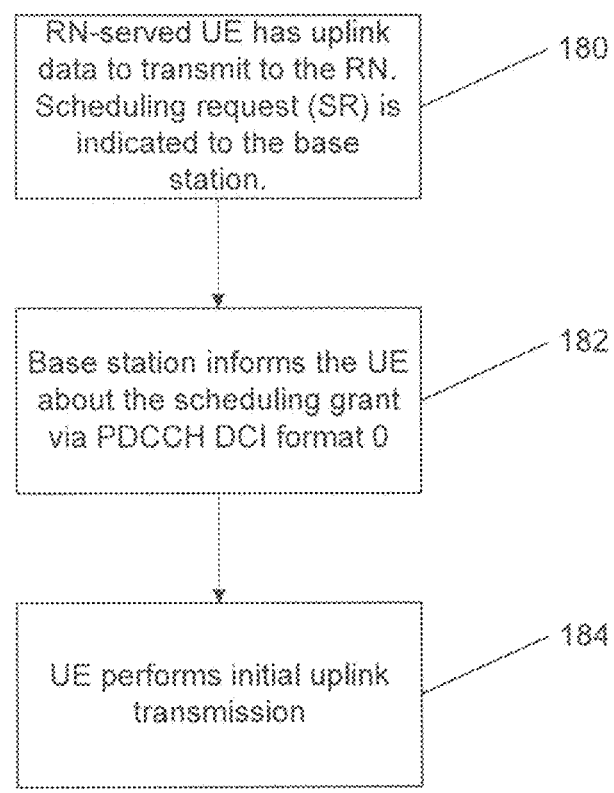
FIG. 6 is an illustration of an exemplary method for a transmission scheme providing intra-cell frequency reuse in uplink (UL) communications.

FIG. 6 is an illustration of an exemplary method for a transmission scheme providing intra-cell frequency reuse in UL communications. In step 180, an RN-served UE has uplink data to transmit to the RN. In that case, a SR is indicated to the base station. In step 182, the base station informs the UE about the scheduling grant via PDCCH DCI format 0. The RN also detects the PDCCH using the blind decoding procedure as described for Rel-8 UEs. Accordingly, after step 182, the RN is aware of when, where, and how to receive the UL initial transmission from the UE.

In step 184, the UE performs initial UL transmission. The UL transmission is received by both the base station and RN. In one implementation, the base station is configured to send an ACK/NACK in response to the UL transmission from the UE, while the RN is not configured to send such an ACK/NACK. In that case, the UE may be configured to always presume that the RN successfully received and decoded the UL packet after initial transmission. Both the UE and the RN then listen for the ACK/NACK from the base station. If the base station does not decode the UL packet after the initial transmission, on the subframe for retransmission, the UE does not attempt to retransmit the UL packet and instead presumes the RN will resend the transmission. In this implementation, the base station may schedule a conservative MCS to ensure a very high probability that the RN will receive and decode the packet at the initial transmission. If neither the RN nor the base station successfully decodes the packet at the initial transmission, the UE can resend the packet after the maximum number of retransmissions is reached.

Alternatively, the base station may be configured to send the ACK/NACK and the RN may be configured to quickly indicate to the base station the status of the RN's uplink reception. Both the UE and the RN may then monitor the ACK/NACK from the base station. If the base station does not successfully receive and decode the packet and the RN receives and decodes the packet successfully, the RN may attempt to initiate subsequent retransmissions of the packet. If, however, neither the RN nor the base station receives the packet successfully, the base station may apply the adaptive uplink HARQ transmission and request the UE to retransmit the packet again. In some cases, a dedicated signaling may be established to deliver the packet reception status at the RN to the base station.

Using the same resource blocks that the UE originally used to send the UE's uplink packet the UE's RN, the cell-center UEs can transmit directly to the base station and other RN-served UEs can also transmit to their RNs simultaneously.

In a similar fashion to DL communications, for improved interference management and channel condition estimation, intra-frequency reuse can be coordinated among neighboring cells. In one example, there are three neighboring cells and the system bandwidth is divided into three parts, f1, f2 and f3. Cell 1 uses f1 and f2 for intra-cell frequency reuse, Cell 2 uses f1 and f3 for intra-cell frequency reuse, and Cell 3 uses f2 and f3 for intra-cell frequency reuse. The configuration of such intra-frequency reuse coordination can be communicated among neighboring cells via, for example, the X2 interface.

Alternatively, the available system bandwidth may be divided into 4 parts where the fourth region is used without any restrictions by any of the cells. The breadth of the fourth region can be adjusted as the loading and the amount of resources needed for intra-cell frequency reuse changes.

When implementing intra-cell frequency-reuse using the present system, the UE transmit PSD of PUCCH may be targeted to the base station to ensure that control information is received by the base station at the appropriate time. Generally, the transmit PSD of SRS and PUSCH may be targeted to the base station if the UE is base station-served or to the RN if the UE is RN-served.

For RN-served UEs, the SRS may be targeted to the serving RN to ensure that other network nodes (e.g., base stations and RNs) in the system are able to receive accurate assessments of UL channel conditions and interference levels. To minimize interference with other UEs, the PUSCH transmit power of an RN-served UE is generally configured to target the RN.

For the UE to set the SRS/PUSCH power to an appropriate level in order to reach the RN, the UE needs to know the RN-UE pathloss. To determine the RN-UE pathloss, when the UE first wakes up from idle mode, the UE may not know whether the UE is associated with the base station or an RN. In that case, the UE sets the transmit PSD of SRS to be targeted to the base station using the estimated base station-UE pathloss. An RN may also receive the SRS and forward the received or observed SRS strength to the base station. If the UE is to be RN-served for UL communications (i.e., the RN sees a stronger SRS), the base station determines the pathloss difference between the base station-UE and the RN-UE links by comparing the received SRS strengths at the base station and RN. In some cases, the base station informs the UE of the pathloss difference via RRC signaling and the UE uses the information to determine the RN-UE pathloss. Afterwards, the UE may set the SRS/PUSCH power at an appropriate level to communicate with the RN. During the active period, the RN may continue to forward the received SRS strength to the base station. In that case, the base station monitors the SRS strengths at the base station and RN. If the UE moves out of the RN coverage area and becomes base station-served, the base station informs the UE so that the UE can set the PSDs of SRS and PUSCH based on the base station-UE pathloss in order to communicate effectively with the base station. Because the SRS is targeted to the RN for RN-served UEs, the RN has access to the estimate of the UL channel conditions. Therefore the RN may be required to forward the estimated MCS as well as the power control command to the base station so that the base station can send the estimated MCS as well as the power control command to the UE in the PDCCH.

In case of intra-cell frequency reuse, the UL channel condition estimated from the SRS may not include the intra-cell interference. As such, a similar outer loop adjustment as described above may be implemented to perform MCS compensation. Accordingly, for each UE the base station collects long-term averaged FER statistics and HARQ termination statistics. Assuming that the MCS selection is targeted for x % FER after N transmissions, if the actual observed average FER after N transmissions is higher than x % the base station may use a lower MCS. Otherwise a higher MCS may be used. The adjustment may be achieved by tuning the MCS directly or by adjusting the estimated SINR to map to a particular MCS. After the outer loop MCS adjustment, if the base station-served cell-center UE cannot support the lowest MCS (e.g., the lowest MCS level specified in Rel-8), the UE may be classified as cell-edge UE and be instructed not to reuse frequencies with the RN-served UEs. Similarly, after the MCS adjustment, if one or more RN-served UEs cannot support the lowest MCS, those RN-served UEs may switch to being base station-served. Alternatively, the base station may compare a spectral efficiency of the lowest MCS level to the spectral efficiency of the certain MCS level to determine whether the UE is a cell-center UE and to determine a power level to use when communicating with the UE.

A simulation of the present system has been conducted in accordance with the simulation parameters of Table 1.

TABLE 1

| Parameter | Assumption/Value |
|---|---|
| Cellular layout | Hexagonal grid, 19 macro eNB, 3 sectors per cell |
| Relay layout | 4 RNs per sector uniformly distributed at ⅘ of cell radius |
| Inter-site distance (ISD) | 1732 m (Case 3), 500 m (Case 1) |
| Distance-dependent path loss for eNB4→UE | $PL_{LOS}(R) = 103.4 + 24.2 \log 10(R)$<br>$PL_{NLOS}(R) = 131.1 + 42.8 \log 10(R)$, R in km.<br>Case 1: $Prob(R) = \min(0.018/R, 1)*(1-\exp(-R/0.063)) + \exp(-R/0.063)$<br>Case 3: $Prob(R) = \exp(-(R-0.01)/1.0)$ |
| Distance-dependent path loss for RN→UE | $PL_{LOS}(R) = 103.8 + 20.9 \log 10(R)$<br>$PL_{NLOS}(R) = 145.4 + 37.5 \log 10(R)$, R in km<br>Case 1: $Prob(R) = 0.5 - \min(0.5, 5\exp(-0.156/R)) + \min(0.5, 5\exp(-R/0.03))$<br>Case 3: $Prob(R) = 0.5 - \min(0.5, 3\exp(-0.3/R)) + \min(0.5, 3\exp(-R/0.095))$ |
| Distance-dependent path loss for eNB->RN | $PL_{LOS}(R) = 100.7 + 23.5 \log 10(R)$<br>$PL_{NLOS}(R) = 125.2 + 36.3 \log 10(R)$, R in Km<br>Case 1: $Prob(R) = \min(0.018/R, 1)*(1-\exp(-R/0.072)) + \exp(-R/0.072)$<br>Case 3: $Prob(R) = \exp(-(R-0.01)/1.150)$<br>Bonus factors for optimized relay site planning follows R1-093726 |
| Shadowing standard deviation | 10 dB (RN to UE); 8 dB (eNB to UE); 6 dB(eNB to RN) |
| Shadowing correlation | 0.5 between sites (including eNB and RN); 1 between sectors per site |
| Penetration loss | 20 dB from eNB to UE, 20 dB from RN to UE, 0 dB from eNB to RN |
| Antenna pattern for macro eNBs to UEs (horizontal) | $A(\theta) = -\min\left[12\left(\frac{\theta}{\theta_{3\,dB}}\right)^2, A_m\right]$<br>$\theta_{3\,db} = 70$ degrees, $A_m = 25$ dB (70 degree horizontal beamwidth) |
| Antenna pattern for macro eNBs to UEs (vertical) | $A(\theta) = -\min\left[12\left(\frac{\theta - \theta_{etilt}}{\theta_{3\,dB}}\right)^2, SLA_v\right]$<br>$\theta_{3\,db} = 10$ degrees, $SLA_v = 20$ dB, antenna downtilt 6 degrees for Case 3 and 15 degrees for Case 1 |
| Combining method in 3D antenna pattern | $A(\phi, \theta) = -\min\{-[A_H(\phi) + A_V(\theta)], A_m\}$ |
| Antenna pattern for relays to UEs | Omni-directional |
| Carrier frequency | 2 GHz |
| Bandwidth | 10 MHz |
| Minimum distance between UE and eNB/RN | 35 m between UE and eNB, 10 m between UE and RN |
| Tx power | 46 dBm for eNB |
| BS antenna gain (incl. cable loss) | 14 dBi |
| Relay antenna gain (incl. cable loss) | 5 dBi |
| UE antenna gain | 0 dBi |
| UE noise figure | 9 dB |
| eNB noise figure | 5 dB |
| Antenna configuration | 1 × 2 for eNB-UE, 1 × 2 for RN-UE |
| Mobile speed | 3 km/h |
| Fast fading | ETU, independent fading for two antenna branches |
| Scheduler | PF with full bandwidth allocation |

TABLE 1-continued

| Parameter | Assumption/Value |
|---|---|
| CQI feedback | Feedback period 5 msec, feedback delay 6 msec |
| Channel estimation | Ideal |
| Control channel overhead | 3 OFDM symbols |
| HARQ combining | Chase |
| Number of users | 25 users per sector distributed in a hotzone fashion |
| Traffic type | Full buffer |

In the simulation, a network of 57 sectors with a site-to-site distance of 0.5 km is used. Each sector has four RNs which are uniformly placed at a distance of ⅘ cell radius from the eNB. There are 25 users per sector distributed in a hotzone fashion. For each of the 4 RNs, 5 users are dropped within 30 m around the RN to ensure that these 5 UEs are within the coverage of the RN (i.e., the UE sees higher signal strength from RN than from the eNB). The remaining 5 UEs are macro UEs which are uniformly dropped in the sector. Channel models in R1-093726, "Text proposal for channel model and evaluation methodology", CMCC, #58 are employed. Directional receiving antennas at RNs are assumed to improve the backhaul link quality.

In the simulation a proportional fairness (PF) scheduler with full bandwidth allocation is employed. With full-band resource allocation the resource blocks of the entire subframe are assigned to one user relieving the scheduling constraint brought by the half-duplex of relay nodes as described in R1-094461, "DL performance evaluation of Type-II relay", RIM, #59. It is assumed that the eNB can transmit simultaneously to multiple RNs on backhaul with advanced transmission schemes such as SDMA. In one subframe, if one or multiple RNs transmit to the RN-served UE(s), the eNB can schedule a cell-center UE with the transmit power of PDSCH lowered to 30 dBm. Intra-cell frequency reuse is not employed for the subframes in which the eNB transmits to cell-edge UEs.

Due to the absence of CRS from the relay nodes, the eNB has no explicit knowledge of link quality for the RN-UE link. In the simulation the eNB estimates the RN-UE link quality via scaling the eNB-UE SINR by the large-scale pathloss difference between eNB-UE and RN-UE links and the transmit power difference between eNB and RN as in R1-094461, "DL performance evaluation of Type-II relay", RIM, #59. It is also assumed that RNs monitor CRS from the eNB and feedback CQIs of backhaul links. The MCS of the RN-served UE is chosen as the smaller of the MCSs that the backhaul and the RN-UE link can support.

Figure 7:
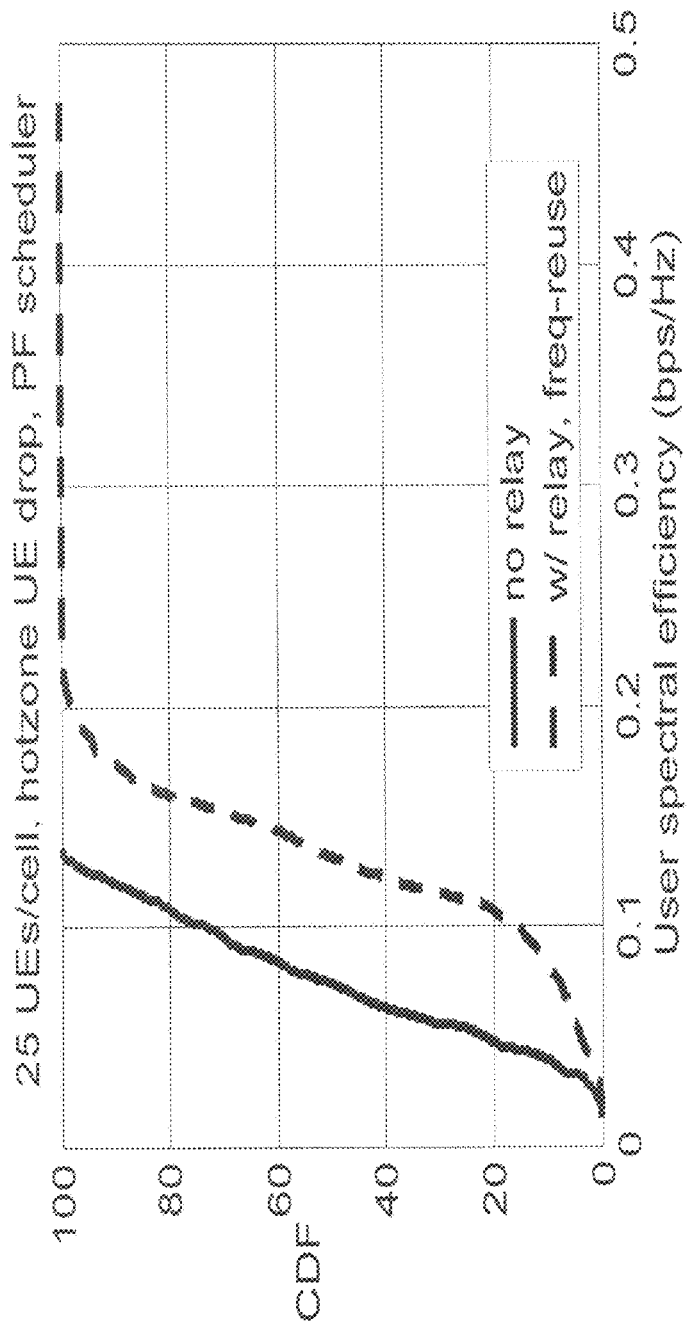
FIG. 7 is a graph showing the throughput gains of a Type II relay network with intra-cell frequency reuse comparing CDF with user spectral efficiency.

FIG. 7 in combination with Table 2 are illustrations showing the throughput gains of a Type II relay network with intra-cell frequency reuse. In comparison with a conventional eNB network, for four RNs per sector and the hotzone UE distribution, gains of 70.9% are observed for cell throughput and 67.9% for cell-edge throughput.

TABLE 2

| | Gain of relay with intra-cell frequency reuse v.s. no relay |
|---|---|
| sector throughput | 70.9% |
| 5% cell-edge user throughput | 67.9% |

Figure 8:
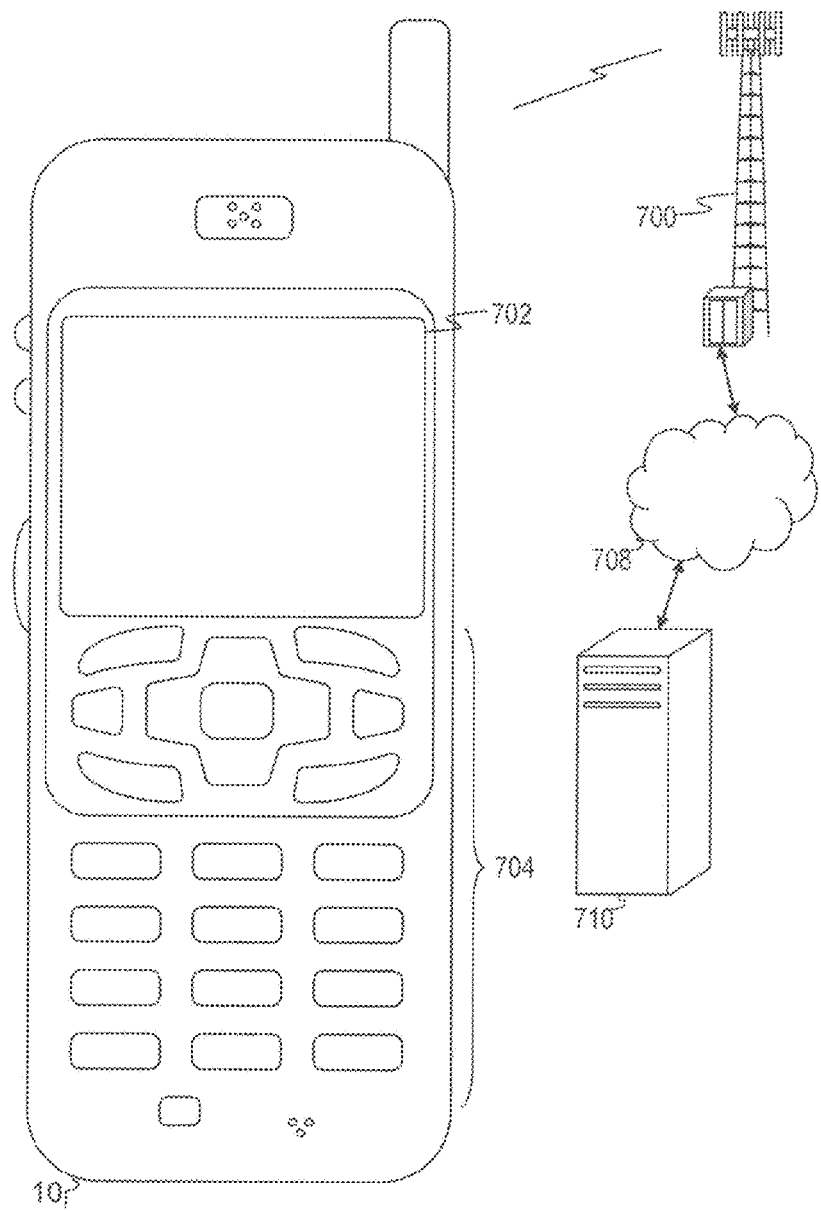
FIG. 8 is a diagram of a wireless communications system including a UE operable for some of the various embodiments of the disclosure.

FIG. 8 illustrates a wireless communications system including an embodiment of a UE 10. UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. The UE 10 may also be a device, include a device, or be included in a device that has similar capabilities but that is not transportable, such as a desktop computer, a set-top box, or a network node. The UE 10 may support specialized activities such as gaming, inventory control, job control, and/or task management functions, and so on.

The UE 10 includes a display 702. The UE 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 702 to show a web page. The web page may be obtained via wireless communications with a wireless network access node, a cell tower, a peer UE 10, or any other wireless communication network or system 700. The network 700 is coupled to a wired network 708, such as the Internet. Via the wireless link and the wired network, the UE 10 has access to information on various servers, such as a server 710. The server 710 may provide content that may be shown on the display 702. Alternately, the UE 10 may access the network 700 through a peer UE 10 acting as an intermediary, in a relay type or hop type of connection.

Figure 9:
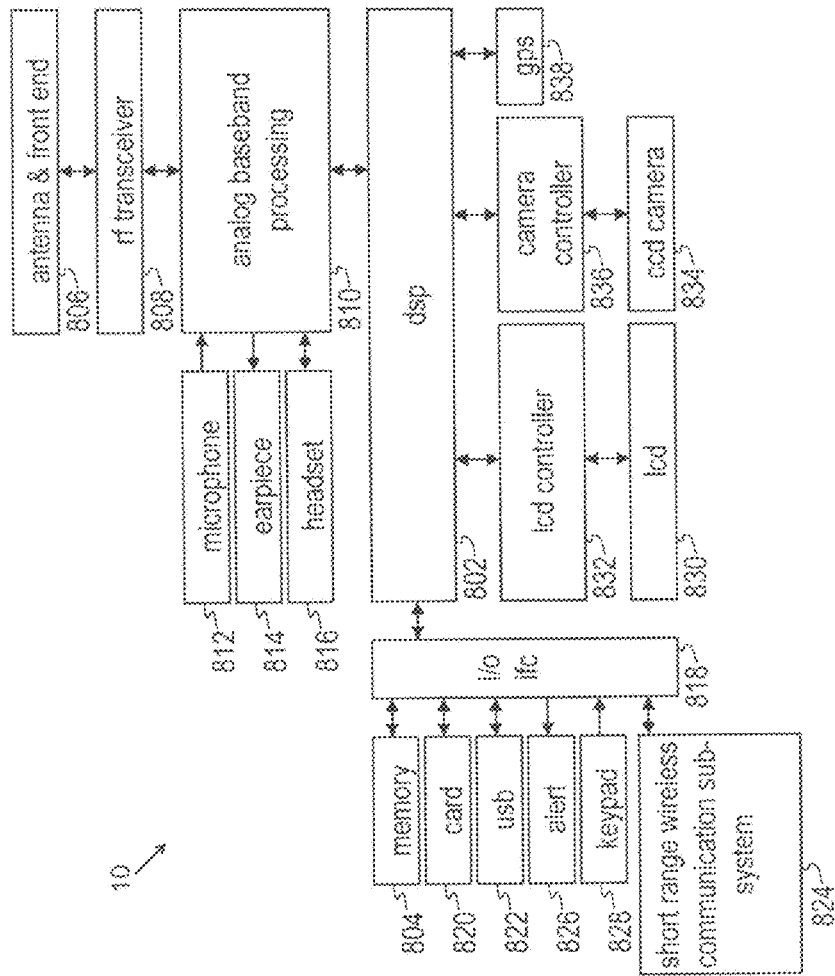
FIG. 9 is a block diagram of a UE operable for some of the various embodiments of the disclosure.

FIG. 9 shows a block diagram of the UE 10. While a variety of known components of UEs 110 are depicted, in an embodiment a subset of the listed components and/or additional components not listed may be included in the UE 10. The UE 10 includes a digital signal processor (DSP) 802 and a memory 804. As shown, the UE 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UE 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UE 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UE 10 to send and receive information from a cellular network or some other available wireless communications network or from a peer UE 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UE 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UE 10 and may also enable the UE 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 818 may further connect the DSP 802 to the alert 826 that, when triggered, causes the UE 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UE 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UE 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UE 10 to determine its position. Various other peripherals may also be included to provide additional functions, e.g., radio and television reception.

Figure 10:
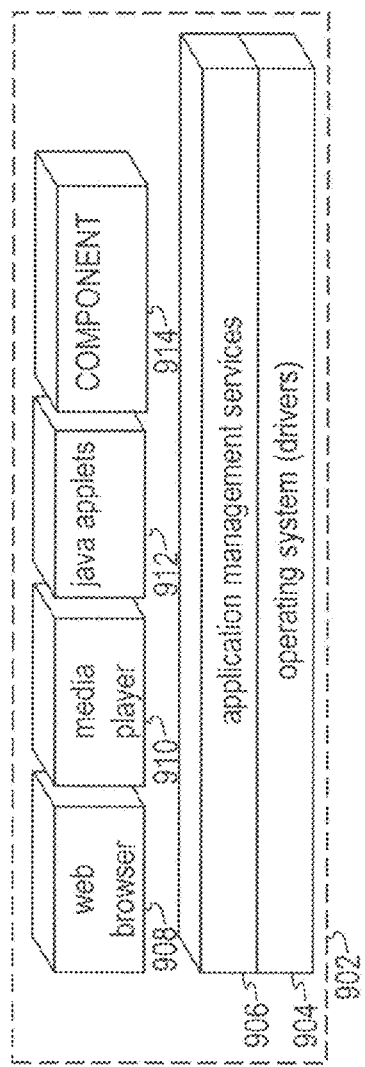
FIG. 10 is a diagram of a software environment that may be implemented on a UE operable for some of the various embodiments of the disclosure.

FIG. 10 illustrates a software environment 902 that may be implemented by the DSP 802. The DSP 802 executes operating system drivers 904 that provide a platform from which the rest of the software operates. The operating system drivers 904 provide drivers for the UE hardware with standardized interfaces that are accessible to application software. The operating system drivers 904 include application management services ("AMS") 906 that transfer control between applications running on the UE 10. Also shown in FIG. 10 are a web browser application 908, a media player application 910, and Java applets 912. The web browser application 908 configures the UE 10 to operate as a web browser, allowing a user to enter information into forms and select links to retrieve and view web pages. The media player application 910 configures the UE 10 to retrieve and play audio or audio-visual media. The Java applets 912 configure the UE 10 to provide games, utilities, and other functionality. A component 914 might provide functionality described herein.

Figure 11:
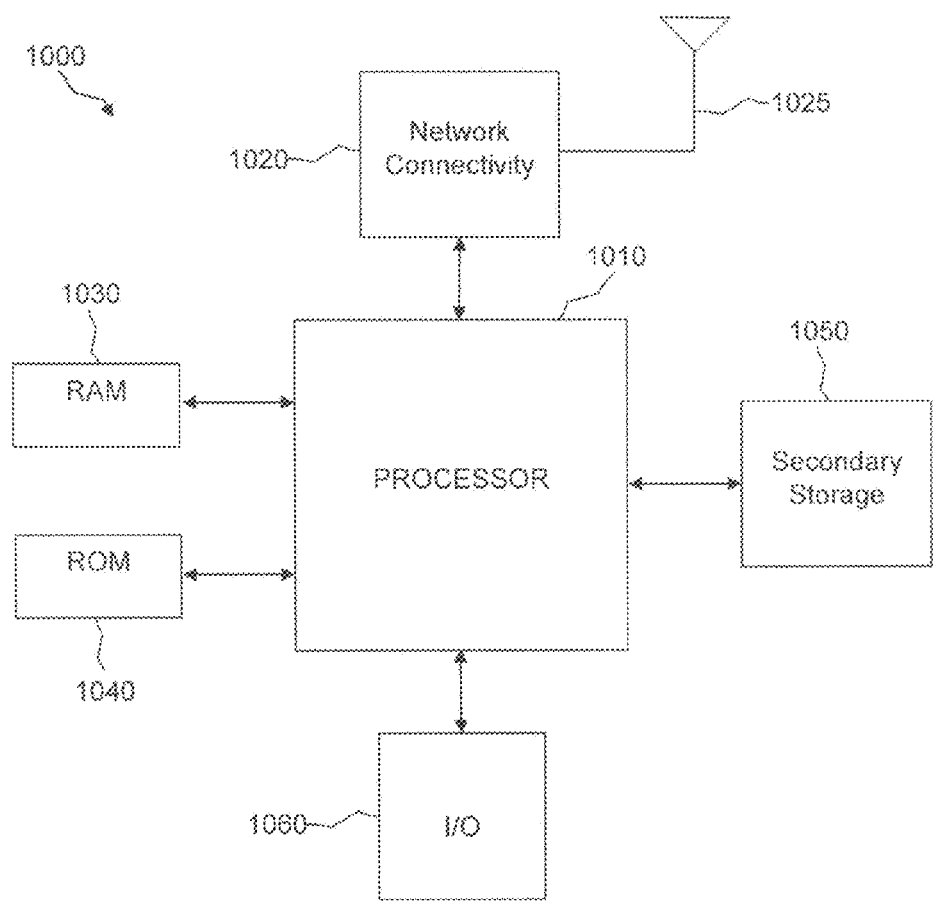
FIG. 11 is an illustrative general purpose computer system suitable for some of the various embodiments of the disclosure.

The UE 10, base station 120, and other components described above might include a processing component that is capable of executing instructions related to the actions described above. FIG. 11 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UE 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other To apprise the public of the scope of this invention, the following claims are made:

1. A method for communicating using a wireless communication network, comprising:
   receiving a channel quality indicator (CQI) from a first UE, the first UE being served by a base station, and the CQI characterizing a channel quality between the first UE and the base station when the base station transmits at a high power;
   determining a first modulation and coding scheme (MCS) when the base station transmits at a low power based on the CQI; and
   when a spectrum efficiency of the first MCS is equal to or higher than a spectrum efficiency of a pre-determined MCS, communicating with the first UE using a low power transmission.

2. The method of claim 1, including, when the spectrum efficiency of the first MCS is equal to or higher than the spectrum efficiency of the pre-determined MCS:
   allocating a first set of resources within a first resource block (RB) to the first UE; and
   allocating the first set of resources within the first RB to a second UE, the second UE being served by a relay node (RN), the RN being in communication with the base station.

3. The method of claim 2, including, when the spectrum efficiency of the first MCS is equal to or higher than the spectrum efficiency of the pre-determined MCS, transmitting the first RB to the first UE using a low power spectral density (PSD).

4. The method of claim 1, including transmitting a physical downlink control channel (PDCCH) downlink control information (DCI) message to the first UE, the PDCCH DCI message identifying a power spectral density (PSD) level of a transmission from the base station to the first UE.

5. The method of claim 1, including, when the spectrum efficiency of the first MCS is lower than the spectrum efficiency of the pre-determined MCS, characterizing the first UE as a cell-edge UE.

6. The method of claim 5, including, when the spectrum efficiency of the first MCS is lower than the spectrum efficiency of the pre-determined MCS:
   allocating a first set of resources within a first set of RBs to the first UE; and
   allocating a second set of resources within the first set of RBs to a second UE, the second set of resources being distinct from the first set of resources, the second UE being served by a relay node (RN), the RN being in communication with the base station.

7. The method of claim 1, wherein determining a first MCS includes:
   using the CQI to determine a signal to interference plus noise ratio (SINR); and
   using the SINR to determine the first modulation and coding scheme (MCS).

8. A base station for communicating using a wireless communication network,
   comprising:
   a processor, the processor being configured to:
   receive a channel quality indicator (CQI) from a first UE, the first UE being served by the base station, and the CQI characterizing a channel quality between the first UE and the base station when the base station transmits at a high power;
   determine a first modulation and coding scheme (MCS) when the base station transmits at a low power based on the received CQI; and
   when a spectrum efficiency of the first MCS is equal to or higher than a spectrum efficiency of a pre-determined MCS, communicate with the first UE using a low power transmission.

9. The base station of claim 8, including, when the spectrum efficiency of the first MCS is equal to or higher than the spectrum efficiency of the pre-determined MCS, the processor is configured to:
   allocate a first set of resources within a first resource block (RB) to the first UE; and
   allocate the first set of resources within the first RB to a second UE, the second UE being served by a relay node (RN), the RN being in communication with the base station.

10. The base station of claim 8, including, when the spectrum efficiency of the first MCS is equal to or higher than the spectrum efficiency of a pre-determined MCS, the processor is configured to transmit the first RB to the first UE using a low power spectral density (PSD).

* * * * *